United States Patent
Nakagawa (10) Patent No.: US 7,764,343 B2
(45) Date of Patent: Jul. 27, 2010

(54) RETARDATION COMPENSATION ELEMENT, LIQUID CRYSTAL DISPLAY DEVICE, AND LIQUID CRYSTAL PROJECTOR

(75) Inventor: Kenichi Nakagawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 11/994,798

(22) PCT Filed: Jul. 3, 2006

(86) PCT No.: PCT/JP2006/313624

§ 371 (c)(1), (2), (4) Date: Apr. 15, 2008

(87) PCT Pub. No.: WO2007/004724

PCT Pub. Date: Jan. 11, 2007

(65) Prior Publication Data
US 2009/0128718 A1    May 21, 2009

(30) Foreign Application Priority Data
Jul. 5, 2005 (JP) ............................. 2005-195878

(51) Int. Cl.
*G02F 1/13363* (2006.01)
(52) U.S. Cl. ...................... 349/121; 349/119
(58) Field of Classification Search .................. None
See application file for complete search history.

(56) References Cited

U.S. PATENT DOCUMENTS

| | | | |
|---|---|---|---|
| 5,196,953 A * | 3/1993 | Yeh et al. ............ | 349/119 |
| 5,504,603 A | 4/1996 | Winker et al. | |
| 2002/0089629 A1 * | 7/2002 | Kim et al. ............ | 349/117 |
| 2003/0103182 A1 * | 6/2003 | Mi et al. ............. | 349/130 |
| 2005/0168662 A1 * | 8/2005 | Nakagawa ............ | 349/5 |
| 2007/0258029 A1 * | 11/2007 | Nakagawa et al. ..... | 349/119 |

FOREIGN PATENT DOCUMENTS

| | | |
|---|---|---|
| EP | 0 676 660 A1 | 10/1995 |
| JP | 7-306406 A | 11/1995 |
| JP | 2004-145268 A | 5/2004 |
| WO | 96/10769 A1 | 4/1996 |
| WO | 2004/010712 A1 | 1/2004 |

* cited by examiner

Primary Examiner—Mike Stahl
(74) Attorney, Agent, or Firm—Sughrue Mion, PLLC (57) ABSTRACT

A retardation compensation element (32, 32a) has a first optical anisotropic layer (42) that functions as a negative C-plate, and a second and a third optical anisotropic layers (43, 44) that function as positive O-plates. VA mode liquid crystal molecules (37) tilt at an azimuth angle of 45 degrees and a polar angle of 5 degrees when no voltage is applied thereto. The second and third optical anisotropic layers have optical axes respectively at an angle of −105 degrees and +105 degrees from the tilt direction of the liquid crystal molecule. The first optical anisotropic layer (42) compensates the retardation of light that enters a liquid crystal layer (38) at an oblique angle while the second and third optical anisotropic layers (43, 44) compensate the retardation of light that enters the liquid crystal layer at a right angle.

11 Claims, 8 Drawing Sheets

RETARDATION COMPENSATION ELEMENT, LIQUID CRYSTAL DISPLAY DEVICE, AND LIQUID CRYSTAL PROJECTOR

TECHNICAL FIELD

The present invention relates to a retardation compensation element, liquid crystal display devices, and liquid crystal projectors, and more particularly to a retardation compensation element suitable for use with a VA mode liquid crystal cell which contains vertically aligned nematic liquid crystals, and the liquid crystal display devices and liquid crystal projectors using this retardation compensation element.

BACKGROUND ART

Liquid crystal display devices have a liquid crystal cell in which nematic liquid crystals are filled between a pair of glass substrates. According to an operating mode of the liquid crystal cell, the liquid crystal devices are classified into TN (Twisted Nematic) mode, VA (Vertical Alignment) mode, IPS (In-Plane Switching) mode, OCB (Optically Compensatory Bend) mode, ECB (Electrically Controlled Birefringence) mode and so forth. While these operating modes differ in details such as an alignment direction of liquid crystal molecules, they are the same in function that electrically controls quantity of light passing through the liquid crystals and thereby displays characters and images.

Able to provide excellent contrast ratio when viewed from the front, the VA mode liquid crystal display devices are favored these days. The VA mode liquid crystal display device has a liquid crystal layer whose liquid crystal molecules are vertically aligned to the glass substrates that hold the liquid crystal layer. Disposed outside the glass substrates is a pair of polarizing plates in crossed nicols arrangement. When no voltage is applied, linearly polarized light that passed through the polarizing plate on a light incoming side (polarizer) goes through the liquid crystal layer with its polarization plane substantially unchanged. This light is subsequently blocked by the polarizing plate on a light outgoing side (analyzer), and a black display state is created. When the maximum voltage is applied, the liquid crystal molecules shift the alignment direction to parallel to the glass substrates. Linearly polarized light that passed through the polarizer changes its polarization plane at 90 degrees as it goes through the liquid crystal layer. This light passes through the analyzer, and a white display state is created.

Generally, the VA mode liquid crystal display devices have a problem related to the direction of viewing, or a viewing angle dependency problem, where they allow leakage of light at certain viewing angles and do not appear black in a black display state. Because of this drawback, the viewers at oblique angles possibly see poor contrast ratio or gray scale inversion where the gray levels are inverted. Thus, there is proposed an optical element for optically compensating retardation of light which suppresses a cause of the light leakage, induced by the liquid crystal layer (see, for example, the Japanese patent laid-open publication No. 2004-145268). This optical element has an optical anisotropic layer functioning as a C-plate whose optical axis extends along normal of the element substrate, and compensates the retardation of light that enters the VA mode liquid crystal cell at an oblique angle.

Figure 7A:
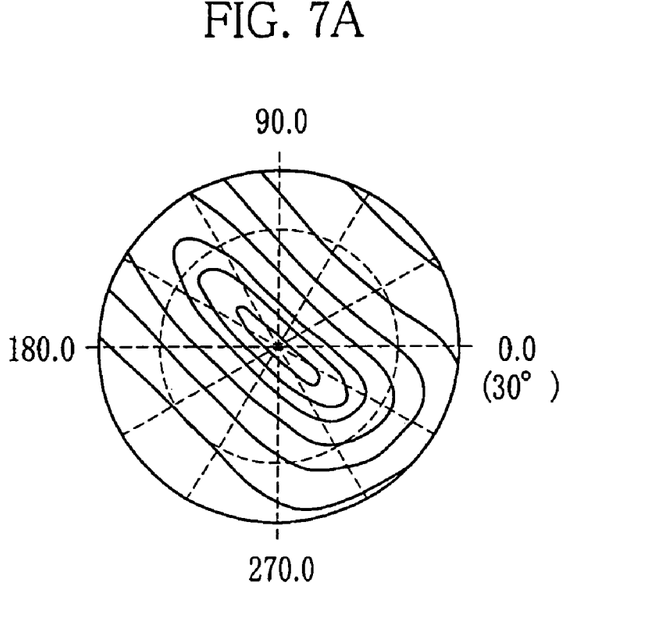
FIG. 7A is a graph showing contrast ratio of a liquid crystal layer relative to viewing angle when used with the retardation compensation element according to a first embodiment of the present invention.
Figure 7B:
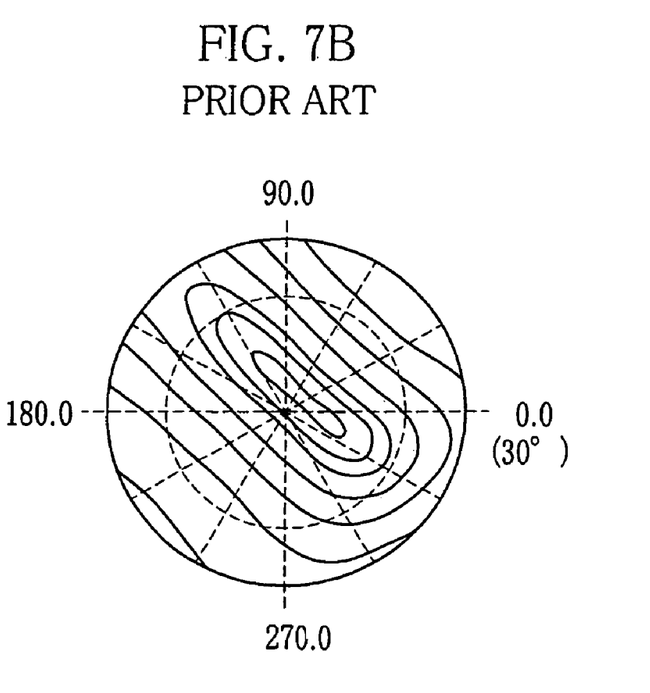
FIG. 7B is the graph showing contrast ratio of the liquid crystal layer relative to viewing angle when used with a conventional retardation compensation element.

However, since liquid crystal molecules in the VA mode liquid crystal cell are not completely aligned vertical when no voltage is applied thereto, even the light that enters the glass substrate at a right angle is subject to the retardation. Because of the retardation, as shown in FIG. 7B, a peak position for the best contrast shifts in the alignment direction of the liquid crystal molecules. As a result, the contrast ratio of the image on the display screen is lowered.

In view of the foregoing, an object of the present invention is to provide a retardation compensation element able to compensate the optical retardation occurred in the VA mode liquid crystal cell, and to provide a liquid crystal display device and a liquid crystal projector equipped with this retardation compensation element.

DISCLOSURE OF INVENTION

In order to achieve the above and other objects, a retardation compensation element according to the present invention includes a first optical anisotropic layer functioning as a C-plate whose optical axis is perpendicular to substrate surfaces of a VA mode liquid crystal cell, and a second optical anisotropic layer functioning as an O-plate whose optical axis is oblique to the substrate surfaces. The VA mode liquid crystal cell has liquid crystal molecules in approximate vertical alignment. The first optical anisotropic layer compensates retardation of light that enters the liquid crystal cell at an oblique angle, while the second and third anisotropic layers compensate retardation of light that enters the liquid crystal cell at a right angle.

The first optical anisotropic layer is a form birefringence composed of several kinds of thin layers with different refractive indices. The thickness of each layer is smaller than the wavelength of visible light. Preferably, the first optical anisotropic layer is composed of alternately stacked two kinds of thin layers, the difference of whose refractive indices is 0.5 or larger within the visible light spectrum.

In a preferred embodiment of the present invention, the retardation compensation element further includes a third optical anisotropic layer functioning as the O-plate whose optical axis is oblique to the substrate surfaces. The optical axes of the second and third optical anisotropic layers are substantially symmetric about the alignment direction of the liquid crystal molecule.

Additionally, the second and third optical anisotropic layers are both the form birefringence composed of column structures arranged at intervals smaller than the wavelength of transmitted light in the visible light spectrum.

It is preferable that the first to third optical anisotropic layers are made of inorganic materials, and at least one of these optical anisotropic layers is made by an evaporation method.

A liquid crystal display device according to the present invention includes the above retardation compensation element and the VA mode liquid crystal cell. In the preferred embodiment of the present invention, the liquid crystal display device has, from a light source side, a polarizer, the VA mode liquid crystal cell, the retardation compensation element, and an analyzer.

A liquid crystal projector according to the present invention includes the above liquid crystal display device, a light source for casting illumination light on the liquid crystal display device, and an optical system for focusing the light modulated by the liquid crystal display device onto a screen. In the preferred embodiment of the present invention, the VA mode liquid crystal cell is a transmissive type. In another embodiment of the present invention, the VA mode liquid crystal cell is either an on-axis reflective type or an off-axis reflective type.

According to the present invention, the first optical anisotropic layer, which functions as a C-plate, compensates the retardation of the light incident on the liquid crystal cell at an oblique angle to widen the viewing angle characteristic of the liquid crystal display device, while the second and third anisotropic layer, which function as O-plates, compensate the retardation of the light incident on the liquid crystal cell at a right angle to direct the direction of the best contrast ratio to the normal of the substrate. The retardation of light is therefore compensated even for the VA mode liquid crystal cell whose liquid crystal molecules are not completely aligned vertical. Thus, the leakage of light is prevented in a wide angle of viewing, and high quality images can be displayed with excellent contrast.

Additionally, if the first to third optical anisotropic layers are made of an inorganic material, the retardation compensation element will become durable and hardly discolor even when irradiated by high-intensity light in the liquid crystal projector.

BEST MODE FOR CARRYING OUT THE INVENTION

Figure 1:
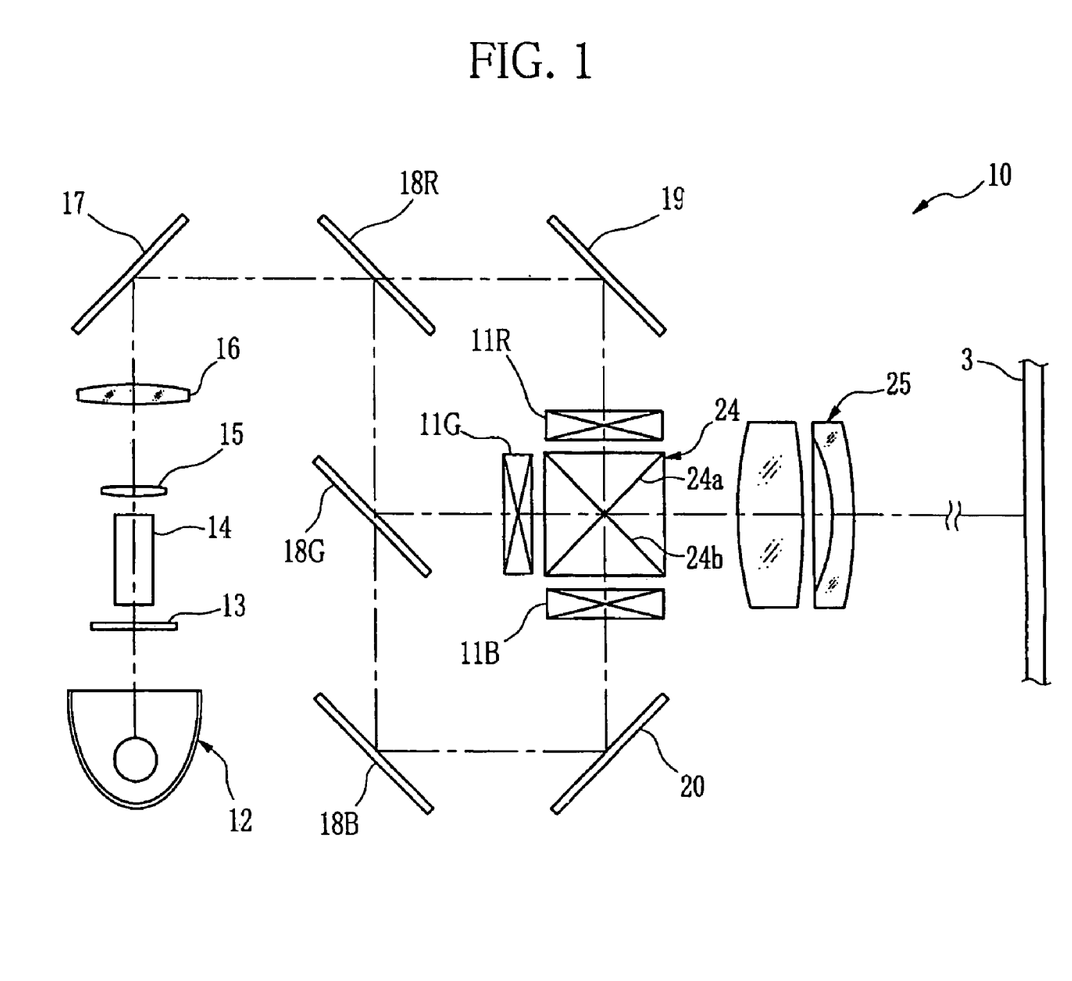
FIG. 1 is a schematic view of a liquid crystal projector according to the present invention.

In FIG. 1, a liquid crystal projector 10 has three transmissive liquid crystal display panels 11R, 11G, and 11B, and projects full color images on a screen 3. White light produced by a light source 12 enters a filter 13, which removes ultraviolet and infrared components from the white light. This white light becomes to have an uniform luminous intensity distribution when passing through a glass rod 14.

The white light that comes out of the glass rod 14 becomes a parallel beam when passing through a relay lens 15 and a collimate lens 16, and proceeds to a mirror 17. Reflected on the mirror 17, the white light is divided into two beams of red and cyan by a dichroic mirror 10R which only transmits red light. The red light that transmits the dichroic mirror 18R is reflected on a mirror 19 and enters the liquid crystal display panel 11R.

The cyan light, which has been reflected on the dichroic mirror 18R, is further divided into two beams of green and blue by a dichroic mirror 18G which reflects green light. The green light that is reflected on the dichroic mirror 18G enters the liquid crystal display panel 11G. On the other hand, the blue light that transmits the dichroic mirror 18G is reflected on mirrors 18B, 20, and enters the liquid crystal display panel 11B.

Each of the liquid crystal display panels 11R, 11G, and 11B has a VA mode liquid crystal cell described below. The liquid crystal display panels 11R, 11G, and 11B separately display gray scale images of red color, green color, and blue color images. In addition, there is a composite prism 24 placed at equal distances from the liquid crystal display panels 11R, 11G, and 11B. Each of the red, green, and blue light is modulated into image bearing light containing image information when passing through the liquid crystal display panels 11R, 11G, and 11B, and combined into three color image light by the composite prism 24 with dichroic surfaces 24a and 24b. The combined image light is projected onto the screen 3 through a projection lens 25, and a full color image is displayed.

Figure 2:
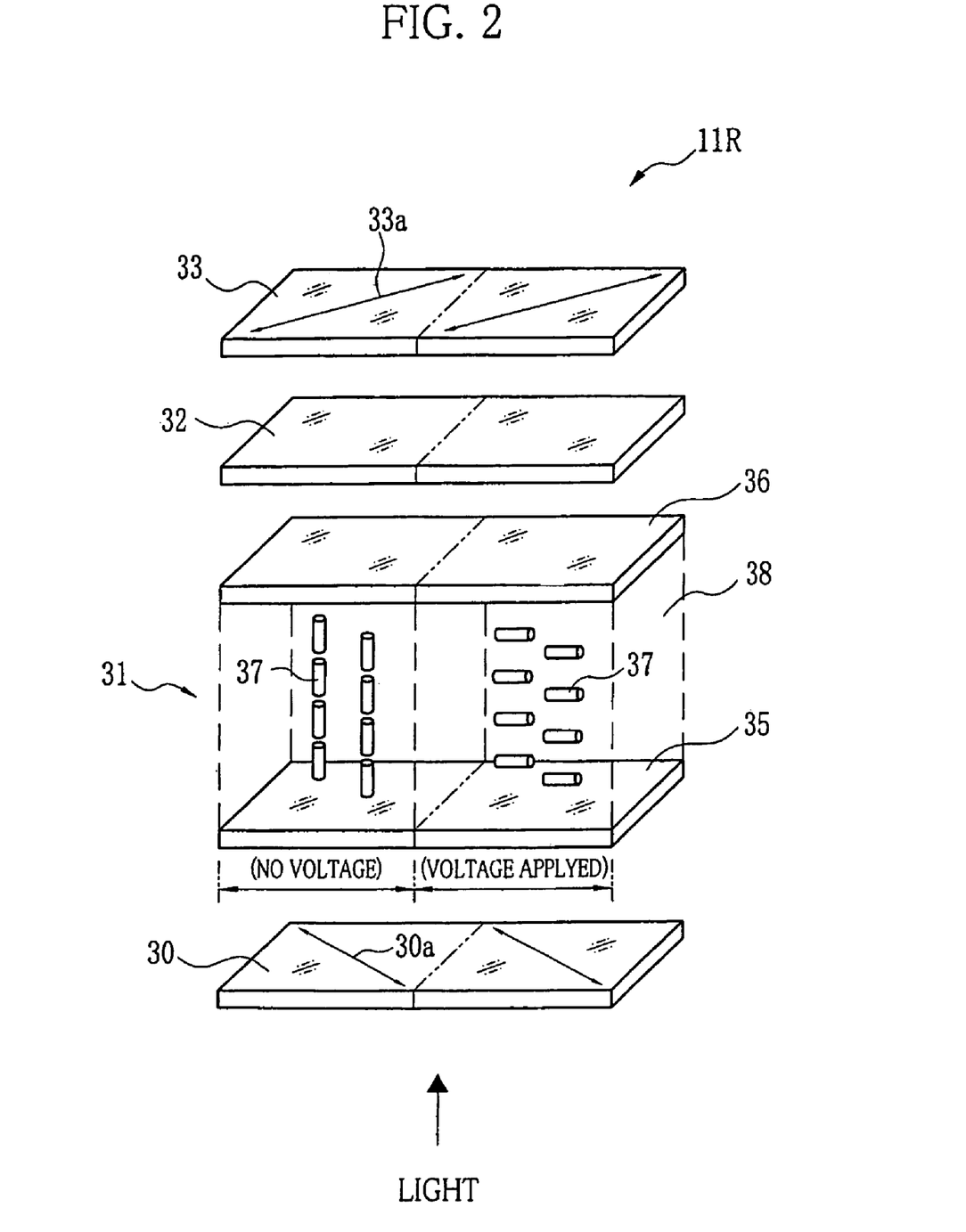
FIG. 2 is a perspective view of a liquid crystal display panel.

As shown in FIG. 2, the liquid crystal display panel 11R has, from the light source side, a polarizer 30 (polarizing plate on a light incoming side), a liquid crystal cell 31, a retardation compensation element 32, and an analyzer 33 (polarizing plate on a light outgoing side). The polarizer 30 and analyzer 33 are in crossed nicols arrangement, so that their absorption axes 30a and 33a are perpendicular to each other. The liquid crystal cell 31 includes a pair of transparent substrates 35 and 36, and a liquid crystal layer 38 made of an organic compound of rod-like liquid crystal molecules 37 that exhibits nematic liquid crystal phase. The transparent substrates 35 and 36 are provided with electrodes (not shown) to apply voltage across the liquid crystal layer 38. This configuration is the same in the liquid crystal display panels 11G and 11B.

When no voltage is applied to the liquid crystal layer 38, the rod-like liquid crystal molecules 37 are aligned vertical to the transparent substrate 35. Note that, although all the rod-like liquid crystal molecules 37 are completely aligned vertical in the drawing, they actually have a predetermined tilt angle (pre-tilt angle) that slightly inclines from normal of the transparent substrate 35. The pre-tilt angle allows easy change of the alignment of the rod-like liquid crystal molecules 37 in the horizontal direction when the voltage is applied. When the voltage is applied to the liquid crystal layer 38, the rod-like liquid crystal molecules 37 in the middle of the liquid crystal layer 38 are aligned parallel to the transparent substrate 35.

Figure 3:
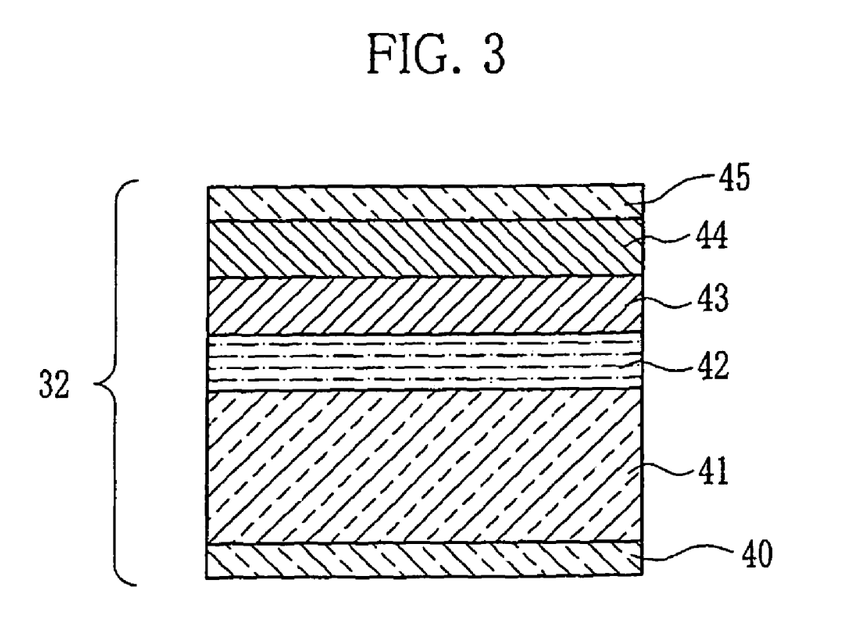
FIG. 3 is a cross sectional view of a retardation compensation element.

As shown in FIG. 3, the retardation compensation element 32 is composed of, from the light source side, an anti-reflection layer 40, a glass substrate 41, a first optical anisotropic layer 42 which functions as a negative C-plate, second and third optical anisotropic layers 43 and 44 which function as positive O-plates, and another anti-reflection layer 45.

The first optical anisotropic layer 42 is a form birefringence constituted of two kinds of thin layers with different refractive indices; $TiO_2$ thin layer and $SiO_2$ thin layer. Made into the same thickness, these thin layers are alternately stacked plural times. The resultant first optical anisotropic layer 42 has an optical axis (the axis of no optical anisotropy) extending in the stacking direction, or normal of the glass substrate 41, and exhibits the optical anisotropy in its surface direction vertical to the normal.

Notably, in order to prevent optical interference between the stacked thin layers, the thin layers should be as thin as possible. When such thin layers with more reduced thickness are used, however, the number of thin layers has to be increased to meet the total thickness necessary for desired retardation. In view of this, the thickness of each thin layer is preferably between $\lambda/30$ and $\lambda/10$, where $\lambda$ is set within 400 to 700 nm; the wavelength range of visible light. Additionally, materials of the thin layers are selected such that the difference (refractive index difference) $\Delta n$ between the maximum value and minimum value of the refractive index becomes 0.5 or larger. If the refractive index difference $\Delta n$ is less than 0.5, the number of thin layers has to be increased for the desired retardation, and the productivity is lowered consequently. The combination of $TiO_2$ thin layer (refractive index n=2.583 to 2.741) and $SiO_2$ thin layer (refractive index n=1.4870 to 1.5442) is therefore preferred. The material for the high refractive index layer may be $TiO_2$ or $ZrO_2$, and the material for the low refractive index layer may be $SiO_2$ or $MgF_2$.

Figure 4:
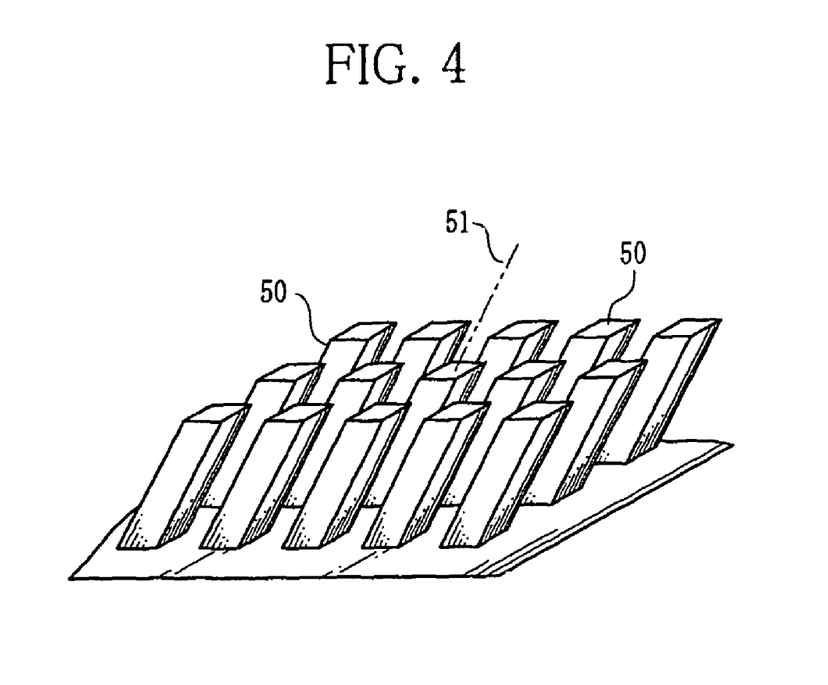
FIG. 4 is a conceptual view illustrating a structure of an O-plate.

As shown in FIG. 4, the second and third optical anisotropic layers 43 and 44 are both a columnar birefringence, "O-plate", whose optical axis inclines from the normal of the glass substrate 41. The term "O-plate" comes from such structural feature. Made by a common oblique evaporation method, the second and third optical anisotropic layers 43 and 44 have transparent columnar structures 50 extending upwards at a predetermined oblique angle. Such layers prepared by oblique evaporation are generally biaxial. The columns have an elliptical cross section that gives rise to the biaxial optical anisotropy. These phenomena in thin films are described in the paper by Macleod, Structure-related Optical Properties of Thin Films, J. Vac. Sci. Technol. A, Volume 4, No. 3, Pages 418-422 (1986). O-plates with either uniaxial or biaxial materials can be used. The columnar structures 50 are arranged at intervals sufficiently smaller than the wavelength of light. The optical axes 51 (direction of no refractive-index anisotropy) lie in the plane that contains the normal of the substrate and the direction of evaporation. In other words, the optical axis directs in the same azimuthal direction as that of oblique evaporation.

Figure 5:
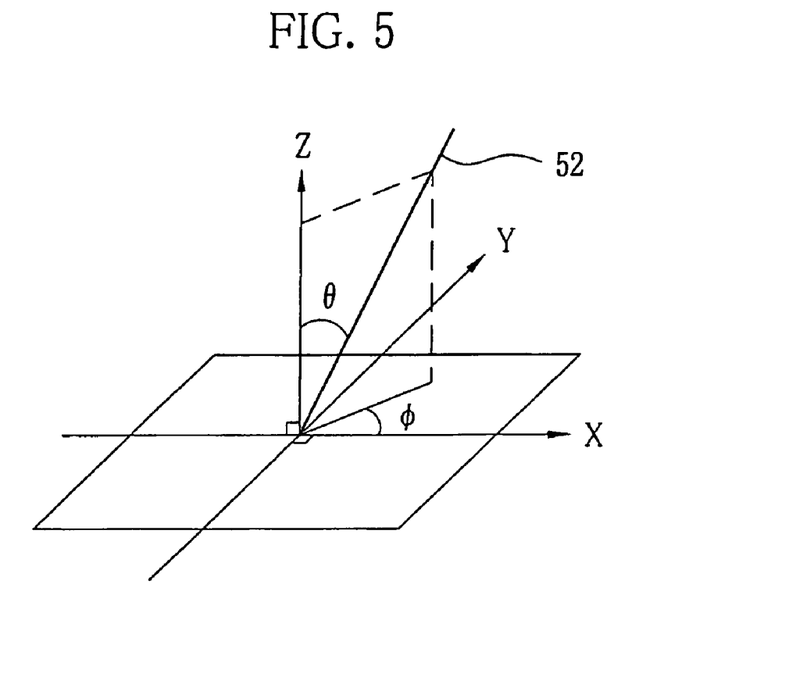
FIG. 5 is an explanatory view illustrating an azimuth angle and a polar angle.

In the second and third optical anisotropic layers 43 and 44, the azimuthal direction of the optical axis 51 is decided according to the pre-tilt angle of the rod-like liquid crystal molecule 37 in the liquid crystal layer 38. To illustrate the pre-tilt angle and optical axes, a coordinate system defined by three coordinate axes (X, Y, Z) mutually orthogonal to each other, as shown in FIG. 5, is introduced. For example, the direction of a straight line 52 is described in this coordinate system by two angles; a polar angle $\theta$ between the straight line 52 and the Z axis, and an azimuth angle $\phi$ between an orthogonal projection of the straight line 52 on the XY-plane and the X axis. In addition, the XY-plane is matched to the substrate surface to illustrate the pre-tilt angle of the rod-like liquid crystal molecule 37 and the optical axes of the first to third optical anisotropic layers 42 to 44.

Figure 6:
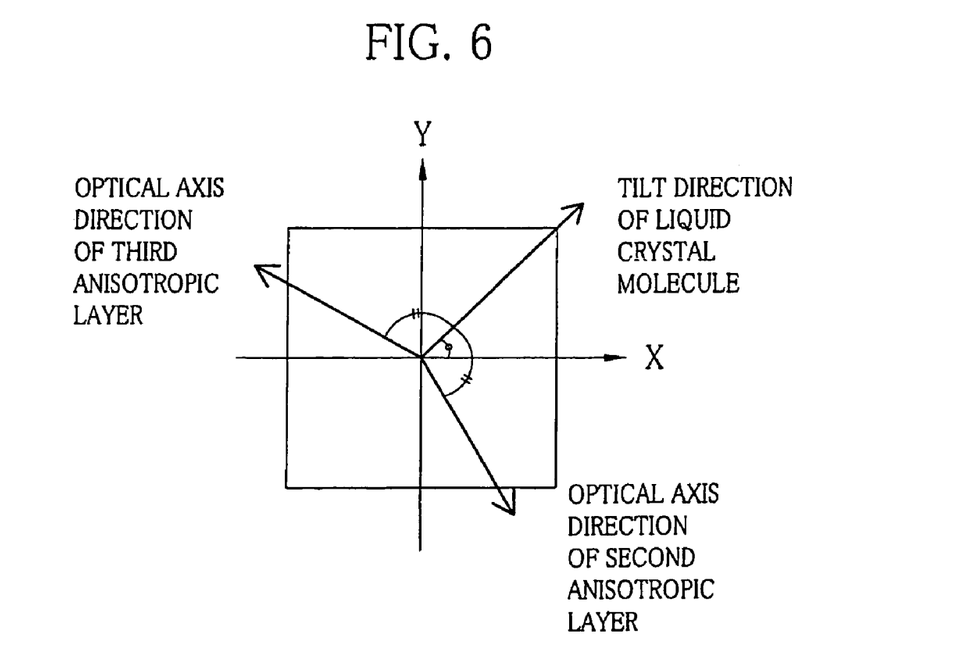
FIG. 6 is an explanatory view illustrating directions of optical axes of two O-plates.

As shown in FIG. 6, the liquid crystal layer 38 with no voltage applied thereto will provide the best viewing angle characteristic when the optical axes of the second and third optical anisotropic layers 43 and 44 are substantially symmetric about the pre-tilt direction of the liquid crystal molecule 37. Specifically, these, optical axes are set at the azimuth angles of −90 to −135 degrees and +90 to +135 degrees respectively from the pre-tilt direction (or tilt direction) of the liquid crystal molecule 37. Note that, in the drawing, the X axis corresponds to the absorption axis 30a of the polarizer 30, and the tilt direction of the liquid crystal molecule is at 45 degrees from the X axis.

TABLE 1

|  | Retardation (d$\Delta$n) | Azimuth angle | Polar angle |
|---|---|---|---|
| VA liquid crystal layer | +400 nm | 45 degrees | 5 degrees |
| First optical anisotropic layer (negative C-plate) | −520 nm | — | 0 degrees |
| Second optical anisotropic layer (positive O-plate) | +40 nm | −60 degrees | 45 degrees |
| Third optical anisotropic layer (positive O-plate) | +40 nm | 150 degrees | 45 degrees |

As shown in TABLE 1, to obtain the best viewing angle characteristic from the liquid crystal layer 38 which has the liquid crystal molecules 37 tilted at the azimuth angle of 45 degrees and the polar angle of 5 degrees, causing the retardation of +400 nm, the first optical anisotropic layer 42 is configured to provide the retardation of −520 nm. Then, the second optical anisotropic layer 43 is configured to provide the retardation of +40 nm and to have the optical axis with the azimuth angle of −60 degrees and the polar angle of 45 degrees. Additionally, the third optical anisotropic layer 44 is configured to provide the retardation of +40 nm and to have the optical axis with the azimuth angle of +150 degrees and the polar angle of 45 degrees. Accordingly, the optical axes of the second and third optical anisotropic layers 43 and 44 respectively form angles of −105 degrees and +105 degrees with respect to the tilt direction of the liquid crystal molecule. FIG. 7A shows a graph of the contrast ratio of the liquid crystal layer relative to the viewing angle in this state.

FIG. 7B, on the other hand, shows a graph of the contrast ratio of the liquid crystal layer relative to viewing angle when used with a conventional retardation compensation element which only has the first optical anisotropic layer 42. In this graph, a point for the best contrast shifts to the tilt direction of the rod-like liquid crystal molecule 37. This means that the contrast ratio is lowered to the viewers in the front. In FIG. 7A, on the contrary, the point for the best contrast exists in the center of the graph when the liquid crystal layer is used with the retardation compensation element of the present invention. This means that the contrast ratio is improved to the viewers in the front.

Figure 8:
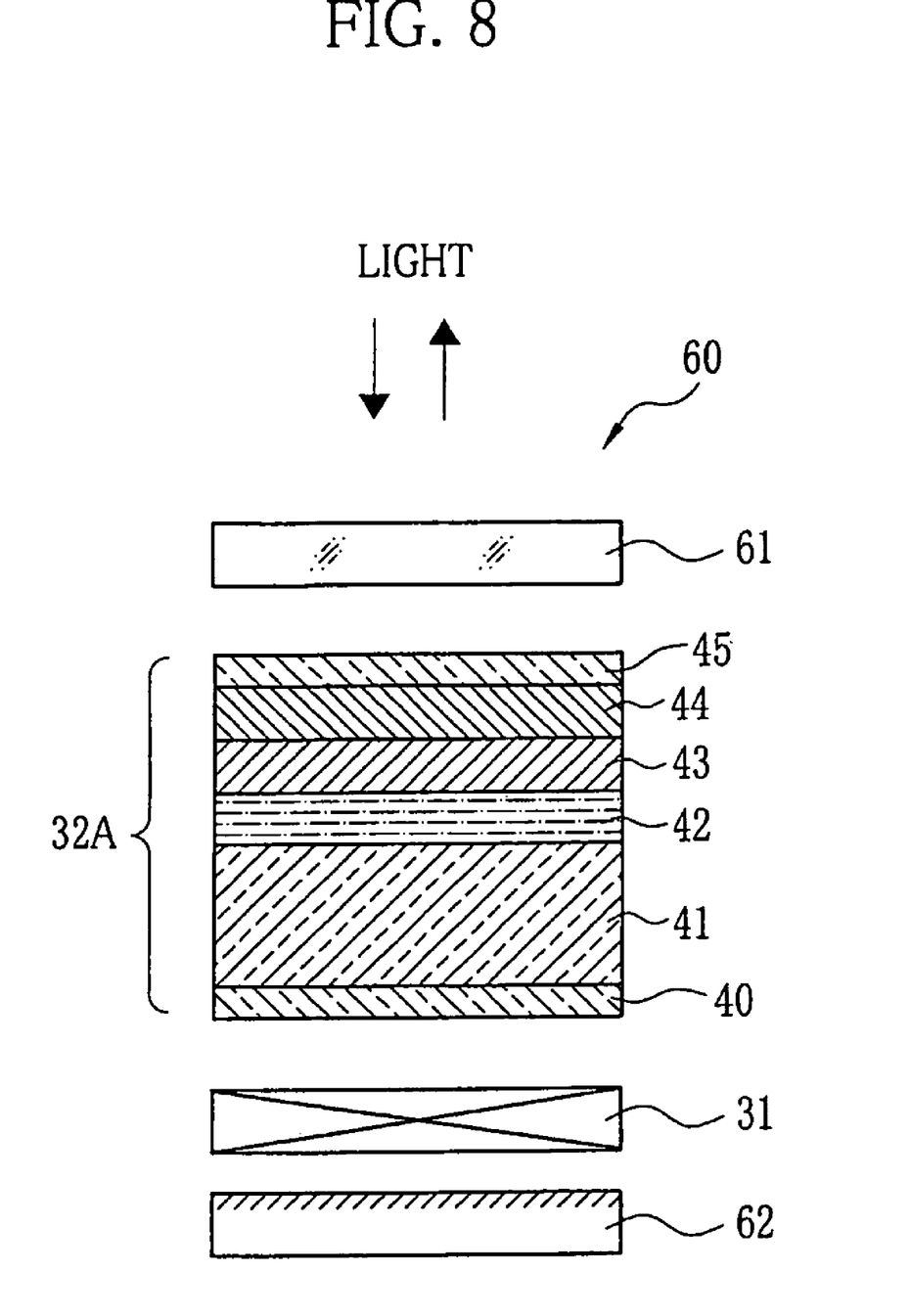
FIG. 8 is a cross sectional view of a liquid crystal display panel according to a second embodiment of the present invention.

Next, a second embodiment of the present invention is explained. In FIG. 8, a liquid crystal display panel 60 is a reflective type and includes, from the light source side, a polarizing plate 61 which works as both the polarizer and the analyzer, a retardation compensation element 32A, the liquid crystal cell 31, and a reflective plate 62. The retardation compensation element 32A shares the same configuration as the retardation compensation element 32 of the first embodiment, except for the thickness of the layers. In the same manner as the TABLE 1, following TABLE 2 shows the features of the retardation compensation element 32A.

TABLE 2

|  | Retardation (d$\Delta$n) | Azimuth angle | Polar angle |
|---|---|---|---|
| VA liquid crystal layer | +200 nm | 45 degrees | 5 degrees |
| First optical anisotropic layer (negative C-plate) | −120 nm | — | 0 degrees |
| Second optical anisotropic layer (positive O-plate) | +10 nm | −55 degrees | 45 degrees |

TABLE 2-continued

| | Retardation (dΔn) | Azimuth angle | Polar angle |
|---|---|---|---|
| Third optical anisotropic layer (positive O-plate) | +10 nm | 145 degrees | 45 degrees |

Figure 9A:
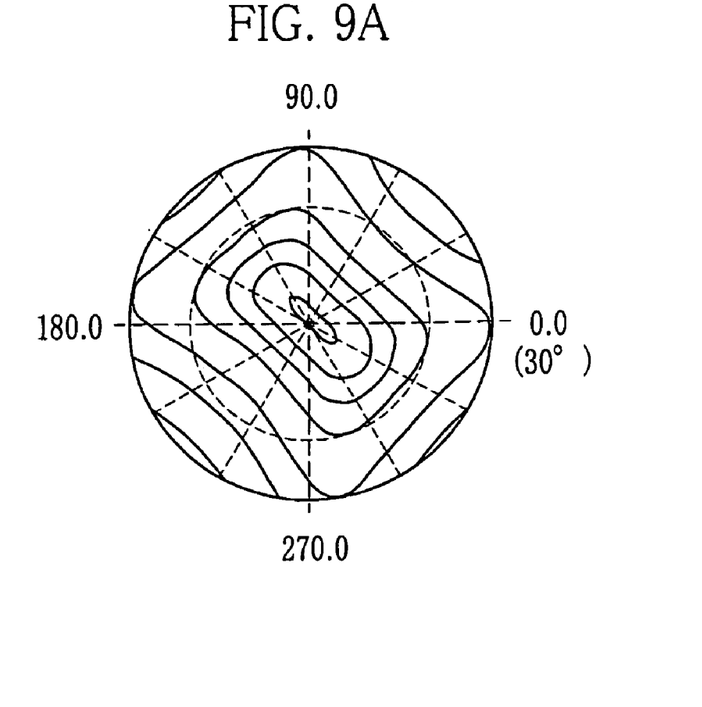
FIG. 9A is the graph showing contrast ratio of a liquid crystal display device relative to viewing angle when equipped with the retardation compensation element according to the second embodiment of the present invention.
Figure 9B:
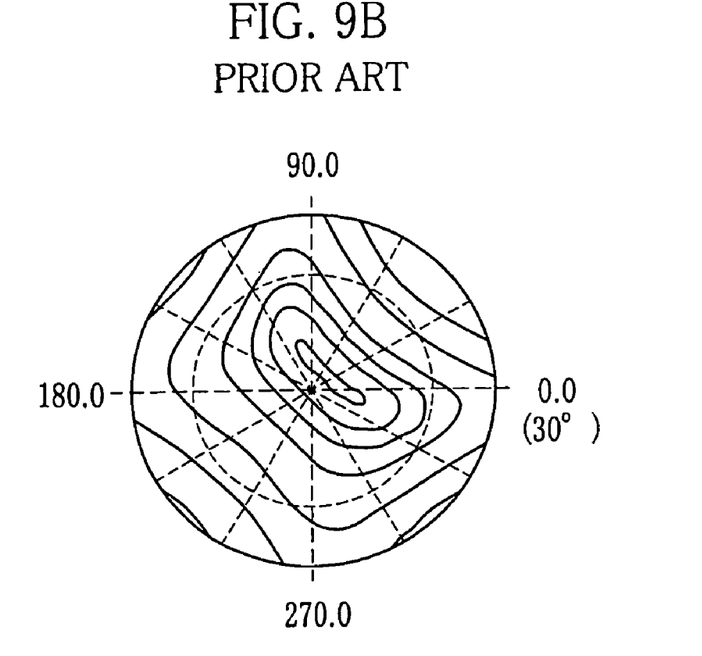
FIG. 9B is the graph showing contrast ratio of the liquid crystal display device relative to viewing angle when equipped with the conventional retardation compensation element.

As shown in FIG. 9A, the liquid crystal display device with the retardation compensation element 32A of the present invention has the point for the best contrast in the center of the graph. On the contrary, as shown in FIG. 9B, the point for the best contrast of the liquid crystal display device shifts to the azimuth angle of 45 degrees when used with the conventional retardation compensation element which only has the first optical anisotropic layer 42.

It should be understood that the first optical anisotropic layer 42 is not limited to the evaporated inorganic thin layers, and may be constituted of an organic film such as, for example, a TAC (triacetyl cellulose) film. Also, it can be prepared by applying cholesteric liquid crystal polymers on a transparent substrate such as a film.

The evaporation method for forming the optical anisotropic layer may be a chemical vapor deposition (CVD) in which a chemical reaction is induced to form thin layers on a surface of a substrate placed in a chamber filled with volatile precursors, or a physical vapor deposition (PVD) in which precursor particles are deposited on a substrate by evaporation or sputtering to form thin layers thereon. In the above embodiments, the first optical anisotropic layer 42 is a negative C-plate. However, if the liquid crystal layer to be used has negative retardation, the first optical anisotropic layer 42 is made into the positive C-plate. Additionally, it is possible to increase the number of the layers when needed.

Figure 10A:
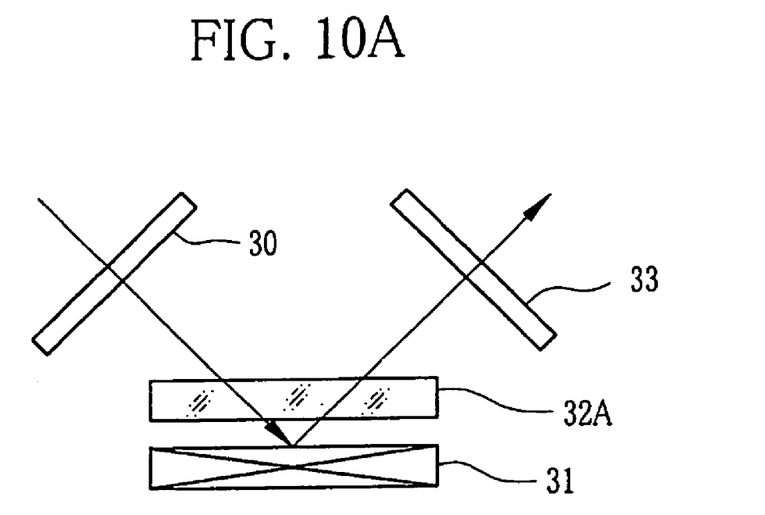
FIGS. 10A and 10B are schematic views of off-axis type liquid crystal display panels.
Figure 10B:
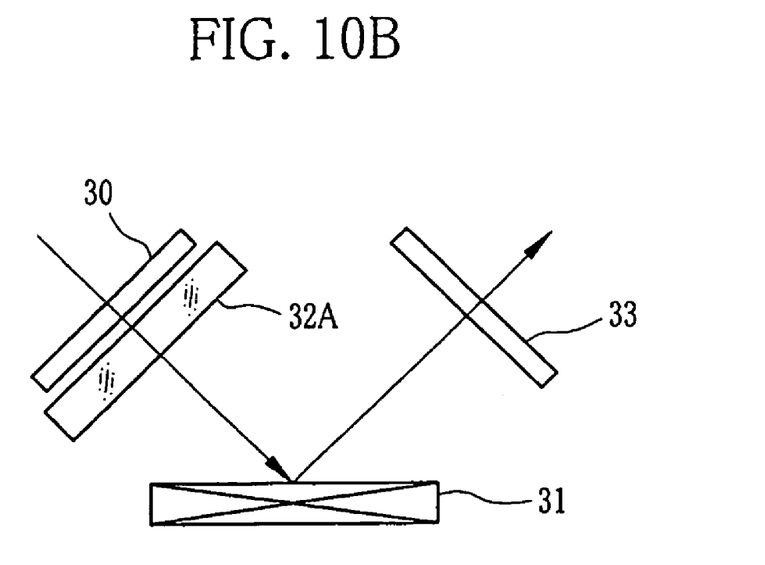

Although the reflective type liquid crystal cell in the second embodiment is used on-axis so that the incident light and outgoing light follow the same light path, the reflective type liquid crystal cell can also be used off-axis. In this case, as shown in FIG. 10A, the retardation compensation element 32A is located near the liquid crystal cell 31. Alternatively, as shown in FIG. 10B, the retardation compensation element 32A may be located in between the polarizer 30 and the liquid crystal cell 31 or in between the analyzer 33 and the liquid crystal cell 31.

As long as between the pair of the polarizing plates, the retardation compensation element provides the same effect wherever located. The location of the retardation compensation element can therefore be decided according to the design factors. In addition, the order of the optical anisotropic layers is not limited to the above embodiments, and can be changed according to the layering process and other conditions. Furthermore, the retardation compensation element of the present invention may be integrated with the liquid crystal cell or the polarizing plate.

Various changes and modifications are possible in the present invention and may be understood to be within the present invention.

INDUSTRIAL APPLICABILITY

The retardation compensation element of the present is used in liquid crystal display devices and liquid crystal projectors having a VA mode liquid crystal cell.

The invention claimed is:

1. A retardation compensation element for compensating retardation of light occurred in a VA mode liquid crystal cell in which liquid crystal molecules are aligned substantially vertical between a pair of transparent substrates, said retardation compensation element comprising:
    a first optical anisotropic layer having an optical axis perpendicular to said transparent substrates, said first optical anisotropic layer functioning as a C-plate and compensating retardation of said light which enters said VA mode liquid crystal cell at an oblique angle;
    a second optical anisotropic layer having an optical axis oblique to said transparent substrates, said second optical anisotropic layer functioning as a uniaxial birefringent O-plate and compensating retardation of said light which enters said VA mode liquid crystal cell at a right angle; and
    further comprising:
    a third optical anisotropic layer having an optical axis oblique to said transparent substrates, said third optical anisotropic layer functioning as a uniaxial birefringent O-plate and compensating retardation of said light which enters said VA mode liquid crystal cell at a right angle,
    wherein said optical axes of said second and third optical anisotropic layers are substantially symmetric about a direction of said alignment of said liquid crystal molecule.

2. A retardation compensation element described in claim 1, wherein said first optical anisotropic layer is a form birefringence composed of thin layers which has different refractive indices and thickness smaller than wavelength of visible light.

3. A retardation compensation element described in claim 2, wherein said first optical anisotropic layer is composed of alternately stacked two kinds of thin layers whose refractive indices differ 0.5 or larger within a visible light spectrum.

4. A retardation compensation element described in claim 1, wherein said second and third optical anisotropic layers are both a form birefringence composed of column structures arranged at intervals smaller than wavelength of transmitted light of visible light spectrum.

5. A retardation compensation element described in claim 1, wherein said first to third optical anisotropic layers are made of inorganic materials.

6. A retardation compensation element described in claim 1, wherein at least one of said first to third optical anisotropic layers is made by an evaporation method.

7. A liquid crystal display device having a VA mode liquid crystal cell in which liquid crystal molecules are aligned substantially vertical between a pair of transparent substrates, and a retardation compensation element for compensating retardation of light occurred in said VA mode liquid crystal cell, said retardation compensation element comprising:
    a first optical anisotropic layer having an optical axis perpendicular to said transparent substrates, said first optical anisotropic layer functioning as a C-plate and compensating retardation of said light which enters said VA mode liquid crystal cell at an oblique angle;
    a second optical anisotropic layer having an optical axis oblique to said transparent substrates, said second optical anisotropic layer functioning as a uniaxial birefringent O-plate and compensating retardation of said light which enters said VA mode liquid crystal cell at a right angle; and
    further comprising:
    a third optical anisotropic layer having an optical axis oblique to said transparent substrates, said third optical anisotropic layer functioning as a uniaxial birefringent O-plate and compensating retardation of said light which enters said VA mode liquid crystal cell at a right angle, wherein said optical axes of said second and third optical anisotropic layers are substantially symmetric about a direction of said alignment of said liquid crystal molecule.

8. A liquid crystal display device described in claim 7, further comprising:

a pair of polarizing plates in crossed nicols arrangement placed in front of said VA mode liquid crystal cell and behind said retardation compensation element.

9. A liquid crystal projector having a liquid crystal display device with a VA mode liquid crystal cell in which liquid crystal molecules are aligned substantially vertical between a pair of transparent substrates, a light source for casting light on said liquid crystal display device, an optical system for focusing said light modulated by said liquid crystal display device onto a screen, and a retardation compensation element for compensating retardation of light occurred in said VA mode liquid crystal cell, said retardation compensation element comprising:

a first optical anisotropic layer having an optical axis perpendicular to said transparent substrates, said first optical anisotropic layer functioning as a C-plate and compensating retardation of said light which enters said VA mode liquid crystal cell at an oblique angle;

a second optical anisotropic layer having an optical axis oblique to said transparent substrates, said second optical anisotropic layer functioning as a uniaxial birefringent O-plate and compensating retardation of said light which enters said VA mode liquid crystal cell at a right angle; and further comprising:

a third optical anisotropic layer having an optical axis oblique to said transparent substrates, said third optical anisotropic layer functioning as a uniaxial birefringent O-plate and compensating retardation of said light which enters said VA mode liquid crystal cell at a right angle, wherein said optical axes of said second and third optical anisotropic layers are substantially symmetric about a direction of said alignment of said liquid crystal molecule.

10. A liquid crystal projector described in claim 9, wherein said liquid crystal display device is a transmissive to transmit said light.

11. A liquid crystal projector described in claim 9, wherein said liquid crystal display device is a reflective to reflect said light.

* * * * *